United States Patent

Coiner et al.

[15] 3,659,625
[45] May 2, 1972

[54] DRAIN VALVE DEVICE

[72] Inventors: Ronald W. Coiner, Irwin; Norman Vutz, Verona, both of Pa.

[73] Assignee: Westinghouse Air Brake Company, Wilmerding, Pa.

[22] Filed: Feb. 16, 1970

[21] Appl. No.: 11,728

[52] U.S. Cl. .......................... 137/204, 251/75, 251/61.1, 137/510
[51] Int. Cl. ........................................................ F16t 1/14
[58] Field of Search ............... 137/204, 203, 510; 251/75, 251/61.1

[56] References Cited

UNITED STATES PATENTS

| | | | |
|---|---|---|---|
| 3,516,430 | 6/1970 | Valentine | 137/204 |
| 2,619,985 | 12/1952 | Wilkerson | 137/204 X |
| 2,070,421 | 2/1937 | Chisholm | 251/75 |
| 2,704,548 | 3/1955 | Ralston | 137/510 X |
| 2,610,645 | 9/1952 | Wagner | 137/510 X |

FOREIGN PATENTS OR APPLICATIONS

| | | | |
|---|---|---|---|
| 320,778 | 10/1929 | Great Britain | 251/61.1 |

*Primary Examiner*—Alan Cohan
*Attorney*—Ralph W. McIntire, Jr.

[57] ABSTRACT

A drain valve in which a diaphragm separates a supply chamber from an exhaust chamber, both chambers being connected in common with a reservoir, and including a Bellville spring normally biasing the diaphragm in a preselected one of an open or closed position relative to an exhaust port. In one embodiment the diaphragm is biased to the closed position and the exhaust chamber is connected with the reservoir by way of a check valve for passing fluid from the reservoir to the exhaust chamber. In another embodiment the diaphragm is biased to the open position and the exhaust chamber is connected with the reservoir by way of a choke and a check valve connected in series, and a reservoir is connected with the outlet of the check valve.

1 Claims, 3 Drawing Figures

Patented May 2, 1972

3,659,625

INVENTOR.
RONALD W. COINER
NORMAN VUTZ
BY Ralph W. McIntire, Jr.
ATTORNEY

DRAIN VALVE DEVICE

BACKGROUND OF INVENTION

The present invention relates to an automatically operative drain valve for periodically expelling contaminants from a fluid pressure storage reservoir. Drain valves heretofore used to effect the expulsion of contaminants from storage reservoirs have been operated by a fluid pressure acting on one side of an abutment in opposition to the yielding resistance of a spring or other biasing means acting on the opposite side. The operation of such drain valves has often resulted in the drain valve being partly rather than fully unseated whereupon both contaminants and fluid under pressure are simultaneously released from the reservoir at a slow rate thereby causing an undesirable release from the reservoir of an excessive quantity of previously compressed fluid under pressure.

Accordingly, it is the general purpose of this invention to provide a novel, simple and economical snap-acting drain valve for periodically expelling all contaminants from a storage reservoir prior to the release of a minimum quantity of compressed fluid before the reclosing of the drain valve occurs.

SUMMARY OF INVENTION

According to the present invention, a novel, simple and economical drain valve is provided which comprises a diaphragm-type valve and a Belleville spring normally biasing the diaphragm-type valve to a preselected one of an open or a closed position relative to a discharge outlet through which contaminants may be expelled from the bottom of a fluid pressure storage reservoir to atmosphere. The diaphragm-type valve is arranged in abutting relationship with one side of the Belleville spring which spring is actuated with a snap-action from one position to another in response to the establishment of a preponderance of pressure on either side with respect to the pressure on the other. When actuated from one position to another, the Belleville spring either effects movement of the diaphragm-type valve therewith or effects subjection of the opposite sides of the diaphragm-type valve to a fluid pressure differential force that causes the movement of the valve to be the same as that of the Belleville spring. Consequently, positive, rapid movement of the valve toward and away from its seat is accomplished thereby ensuring that the valve is always either opened a maximum amount or biased against its seat to prevent the possibility of leakage.

Figure 1:
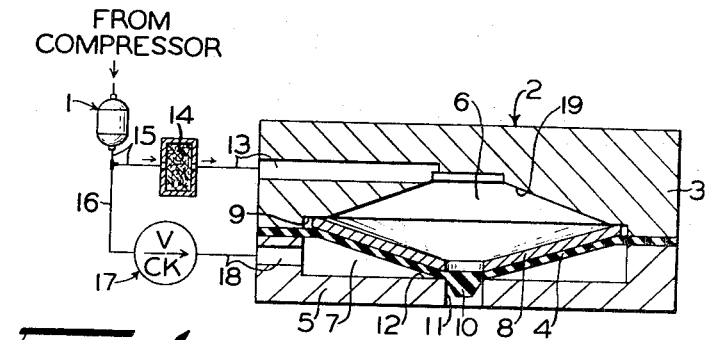
FIG. 1 is a diagrammatic view showing a fluid pressure storage reservoir having associated therewith an automatically operable drain valve constructed in accordance with a first embodiment of the invention.

Referring to FIG. 1 of the drawing, a fluid pressure storage reservoir 1 has associated therewith a drain valve 2 which constitutes the first embodiment of the present invention.

The drain valve 2 comprises a casing 3 and a flat-type diaphragm 4 the periphery of which is clamped between the casing 3 and a bottom cover member 5 that is secured to the casing 3 by any suitable means (not shown). The diaphragm 4 cooperates with the casing 3 and the bottom cover member 5 to form on the respective opposite sides of the diaphragm a pressure chamber 6 and a sump chamber 7. An annular Belleville spring 8 is disposed in the pressure chamber 6 with its lower side normally in abutting relationship with the upper side of the diaphragm 4 and its outer periphery interposed between the upper side of the diaphragm and an annular shoulder 9 formed on the casing 3.

Formed integral with the diaphragm 4 and extending downward from the lower side thereof is a boss 10 which, while the diaphragm occupies the position shown in FIG. 1, extends into a bore 11 provided in the bottom cover member 5. Formed on the bottom cover member 5 and surrounding the upper end of the bore 11 is a flat surface 12 that constitutes a valve seat against which that portion of the diaphragm 4 surrounding the boss 10 is biased to form a seal therewith by the Belleville spring 8 while this spring and the diaphragm 4 occupy the position shown in FIG. 1. Thus, the diaphragm 4 constitutes a valve for controlling flow from the sump chamber 7 to atmosphere via the bore 11.

The chamber 6 is connected by a passageway and corresponding pipe 13 to the outlet of a filter 14. The inlet of the filter 14 is connected to the storage reservoir 1 by a pipe 15.

One end of a pipe 16 is connected to the pipe 15 intermediate the ends thereof and the opposite end of this pipe 16 is connected to the inlet of a one-way flow check valve 17. The outlet of the check valve 17 is connected to the chamber 7 in the drain valve 2 by a pipe and corresponding passageway 18.

For the purpose of understanding the operation of the invention, it will suffice to state that a compressor (not shown) together with an unloader (not shown) and a governor (not shown) function in the usual well-known manner to maintain pressurized fluid in the storage reservoir 1 within an operating range between a predetermined minimum and maximum pressure. When the compressor is unloaded, it operates without compressing further fluid under pressure into the reservoir 1.

Referring to FIG. 1, it will be seen that fluid under pressure will flow from the reservoir 1 to the chamber 6 in the drain valve 2 via pipe 15, filter 14 and pipe and passageway 13 it being understood that the purpose of the filter 14 is to prevent the entrance and accumulation of contaminants in the chamber 6.

Likewise, fluid under pressure, together with the contaminants therein and in the bottom of the reservoir 1, will flow from the reservoir 1 to the sump chamber 7 in the drain valve 2 via pipes 15 and 16, check valve 17, and pipe and passageway 18. It will be understood that the contaminants supplied to the chamber 7 will settle to the bottom of this chamber and be subjected to the fluid under pressure present therein which fluid under pressure is confined to the remaining volume of this chamber that is above these contaminants.

Subsequent to the unloading of the compressor, the usage of fluid under pressure from the storage reservoir 1 will effect a reduction of the pressure therein. Since the chamber 6 in the drain valve 2 is directly connected to the storage reservoir 1 via passageway and pipe 13, filter 14 and pipe 15, a corresponding reduction of pressure will occur in the chamber 6, it being understood that the check valve 17 prevents a corresponding reduction of pressure in the chamber 7.

It is a known characteristic of Belleville springs that if the ratio of height to thickness is greater than 1.41, the load reaches a peak and then decreases with further deflection. If the ratio of height to thickness is greater than 2.83, the load will become negative at some point beyond the horizontal position and will require loading in the opposite direction to bring it back to its free position. In other words, it will turn inside out. For a "constant load" spring the ratio of height to thickness should be between 1.3 and 1.6.

In order to ensure proper operation of the drain valve 2, the ratio of height to thickness of the Belleville spring 8 should be between 1.6 and 2.83 so that this spring will turn inside out upon the pressure in the chamber 6 being reduced to a value that is a chosen amount less, for example, 10 pounds per square inch, than the pressure trapped in the chamber 7 by the check valve 17, and then return to the position shown in FIG. 1 upon the pressure in the chamber 7 exceeding the pressure in the chamber 6 by, for example, 2 pounds per square inch.

Assuming that the governor operates to effect unloading of the compressor upon the pressure in the storage reservoir 1 reaching a value of, for example, 150 pounds per square inch, it will be understood that the pressure in the chambers 6 and 7 in the drain valve 2 is the same as that in the storage reservoir 1 prior to use of compressed fluid from this reservoir. Accordingly, when the use of fluid under pressure from the storage reservoir 1 has reduced the pressure therein and in the chamber 6 in drain valve 2 to a value of 140 pounds per square inch, it being remembered that the trapped pressure in the chamber 7 is 150 pounds per square inch, a pressure differential of 10 pounds per square inch is established on the opposite sides of the diaphragm 4 and likewise on the opposite sides of the Belleville spring 8 which differential is sufficient to cause this Belleville spring to turn inside out.

When the Belleville spring 8 is thus turned inside out, or moved from the position in which it is shown in FIG. 1 to its other position in which it substantially abuts a conical surface 19 formed on the casing 3, the trapped fluid under pressure present in the chamber 7 above the contaminants in this chamber and acting on the lower side of the diaphragm 4 is rendered effective to deflect this diaphragm upward until its upper side abuts the lower side of the now turned inside out Belleville spring 8. When the diaphragm 4 is thus deflected upward, it is moved out of sealing contact with the flat surface or valve seat 12 on the bottom cover member 5 and the boss 10 integral with this diaphragm is withdrawn from the bore 11.

Upon movement of the diaphragm 4 to its upper position which occurs substantially simultaneously as the Bellevile spring 8 turns inside out, the fluid under pressure present in the chamber 7 and acting on top of the contaminants in this chamber forces substantially all of the contaminants in this chamber 7 to flow to atmosphere via the bore 11 before this fluid under pressure likewise flows to atmosphere via this bore.

When the fluid under pressure present in the chamber 7 has reduced to a value of, for example, 142 pounds per square inch, the remaining differential fluid pressure force acting on the opposite sides of the Belleville spring 8 is insufficient to maintain this spring turned inside out and in the position in which its upper side substantially abuts the conical surface 19 on the casing 3. Consequently, it turns outside in or, in other words, returns or snaps back to the position shown in FIG. 1.

As the Belleville spring 8 returns to the position shown in FIG. 1, it is effective to simultaneously deflect the diaphragm 4 downward to the position shown. In this position of the diaphragm 4 and Belleville spring 8, this spring is effective to bias the diaphragm 4 against the flat surface 12 with sufficient force to form a seal therebetween which prevents further flow of fluid under pressure from the sump chamber 7 to atmosphere via bore 11 in which is now disposed the boss 10.

When further use of fluid under pressure from the storage reservoir 1 reduces the pressure therein to the value at which the governor operates to reload the compressor, this compressor will operate to supply fluid under pressure to the storage reservoir 1 until the pressure therein is increased to the value required to cause unloading of the compressor.

Subsequent use of fluid under pressure from the reservoir 1 will reduce the pressure therein and cause the drain valve 2 to again operate in the manner hereinbefore described in detail to release contaminants from the chamber 7 in the drain valve 2 to atmosphere. From the foregoing, it is apparent that each time the pressure in the storage reservoir 1 is reduced as the result of usage of fluid under pressure therefrom subsequent to the unloading of the compressor that supplies fluid under pressure to this reservoir, the drain valve 2 operates to expel contaminants to atmosphere. Thus, the storage reservoir 1 is substantially kept free of contaminants which if allowed to collect therein would reduce its volume and therefore the quantity of fluid under pressure stored therein.

Figure 2:
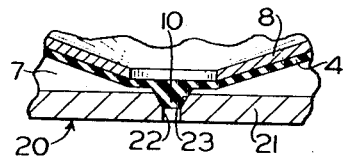
FIG. 2 is a partial cross-sectional view of an automatically operable drain valve constructed in accordance with a second embodiment of the invention.

There is shown in FIG. 2 a partial cross-sectional view of an automatically operable drain valve 20 that differs from the drain valve 2 shown in FIG. 1 only in that the bottom cover member 5 is replaced by a bottom cover member 21 that is provided with a bore 22 that has formed at its upper end a tapered or poppet-type valve seat 23. While the Belleville spring 8 and diaphragm 4 occupy the position shown in FIG. 2, the Belleville spring 8 is effective to bias the tapered sides of the boss 10 against the poppet-type valve seat 23 with sufficient force to form a seal therebetween thus closing communication between the sump chamber 7 and atmosphere via the bore 22.

The operation of the drain valve 20 is identical to the operation of the drain valve 2. Therefore, a detailed description of the operation of the drain valve 20 is not deemed necessary.

Figure 3:
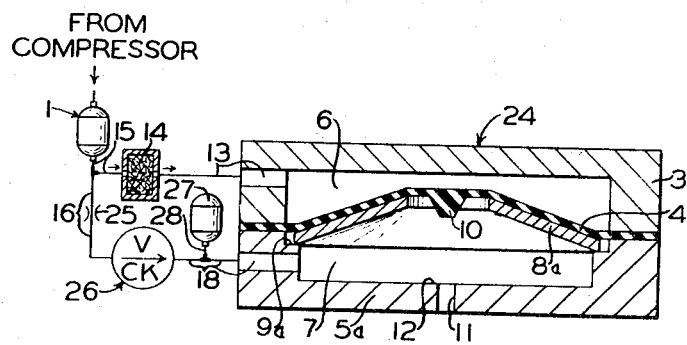
FIG. 3 is a diagrammatic view showing a fluid pressure storage reservoir having associated therewith an automatically operable drain valve constructed in accordance with a third embodiment of the invention.

FIG. 3 shows a drain valve 24 that constitutes a third embodiment of the invention. The drain valve 24 shown in FIG. 3 is identical in construction to the drain valve 2 shown in FIG. 1, except that the Belleville spring 8 of the first embodiment of the invention is replaced by a Belleville spring 8a which is disposed in the chamber 7 below the diaphragm 4 instead of in the chamber 6 above this diaphragm, and a bottom cover member 5a having a shoulder 9a is substituted for the cover member 5 shown in FIG. 1, it being noted that the outer periphery of the Belleville spring 8a is interposed between the shoulder 9a and the lower side of the diaphragm 4. Accordingly, like reference numerals have been used to designate the structure shown in FIG. 3 which is identical to that shown in FIG. 1 and already described. Only such features of the structure and operation of the embodiment of FIG. 3 which differ from that of the embodiment of FIG. 1 will be hereinafter described.

According to the third embodiment of the invention shown in FIG. 3, a choke 25 of fairly large diameter is disposed in the pipe 16 on the inlet side of a spring-loaded check valve 26 which replaces the check valve 17, and a volume reservoir 27 is connected to the pipe 18 intermediate the ends thereof by a pipe 28.

For the purpose of understanding the operation of the third embodiment of the invention shown in FIG. 3, it will be understood that pressurized fluid is maintained in the storage reservoir 1 in the same manner as hereinbefore described for the first embodiment of the invention shown in FIG. 1. Accordingly, fluid under pressure will flow from the reservoir 1 to the chamber 6 in the drain valve 24 via pipe 15, filter 14 and pipe and passageway 13.

Likewise, fluid under pressure, together with the contaminants therein and in the bottom of the reservoir 1, will flow from this reservoir to the sump chamber 7 in the drain valve 24 via per 15 and 16, the relatively large choke 25, spring-loaded check valve 26 and pipe and passageway 18. Fluid under pressure also flows from the pipe 18 to the volume reservoir 27 via the pipe 28. The spring of the check valve 26 may be of such strength that the pressure in the sump chamber 7 may be, for example, 20 pounds per square inch less than that in the chamber 6. Accordingly, it will be seen that when the compressor is originally started and then loaded, it will build up a pressure of 20 pounds or square inch in the reservoir 1 and the chamber 6 in the drain valve 24 before the spring-loaded check valve 26 is unseated to allow the flow of fluid under pressure to the chamber 7 and the volume reservoir 27. It will, therefore, be understood that upon the pressure in the storage reservoir 1 and the chamber 6 reaching a pressure of substantially 20 pounds per square inch, and while the pressure in the chamber 7 is atmospheric, this pressure differential of 20 pounds per square inch established on the opposite sides of the diaphragm 4, and likewise on the opposite sides of the Belleville spring 8a shown in FIG. 3, is effective to cause this spring to turn inside out and move from the position shown in FIG. 3 to its other position. When the Belleville spring 8a thus turns inside out, the fluid under pressure present in the chamber 6 is rendered effective to deflect the diaphragm 4 downward from the position shown in FIG. 3 to a position in which the boss 10 is disposed in the bore 11 and the lower side of that portion of this diaphragm 4 surrounding this boss forms a seal with the flat surface 12 on the bottom cover member 5a to close communication between the chamber 7 and atmosphere.

It will be understood that the Belleville spring 8a turns inside out and the diaphragm 4 is moved into sealing engagement with the flat surface 12 just prior to or substantially at the time that fluid under pressure supplied from the storage reservoir 1 to the spring-loaded check valve 26 via the pipes 15 and 16 and choke 25 unseats this check valve and flows to the sump chamber 7 and the volume reservoir 27 via pipe and passageway 18 and pipe 28 since the choke 25 slightly inhibits or retards the build-up of pressure at the inlet of the spring-loaded check valve 26.

Continued operation of the now loaded compressor will effect the supply of fluid under pressure to the storage reservoir 1 and the chambers 6 and 7 in the drain valve device 24 until the desired maximum pressure is obtained in the storage reservoir 1 and the chamber 6 at which time the governor operates to effect unloading of the compressor.

As in the first embodiment of the invention, fluid under pressure, together with the contaminants therein and in the bottom of the reservoir 1, will flow from this reservoir to the sump chamber 7 in drain valve 24 via pipes 15 and 16, choke 25, spring-loaded check valve 26 and pipe and passageway 18. Some of the fluid under pressure supplied to the pipe 18 flows therefrom to the volume reservoir 27 via the pipe 28 so that this reservoir is charged simultaneously as the chamber 7.

As in the previous embodiments of the invention, it will be understood that the contaminants supplied to the chamber 7 in the drain valve 24 will settle to the bottom of this chamber and be subject to the fluid under pressure present therein which fluid under pressure is confined to the remaining volume of this chamber that is above these contaminants, it being understood that the pressure in this chamber 7 is, for example, 20 pounds per square inch less than the pressure in the chamber 6.

Usage of fluid under pressure from the storage reservoir 1, subsequent to the unloading of the compressor, effects a corresponding reduction of the pressure in the chamber 6 in drain valve 24, it being remembered that chamber 6 is directly connected to the reservoir 1 via passageway and pipe 13, filter 14 and pipe 15. As in the first embodiment of the invention, the check valve 26 prevents back flow from the chamber 7 in drain valve 24.

Assuming that the governor operates to effect unloading of the compressor upon the pressure in the storage reservoir 1 reaching a valve of, for example, 150 pounds per square inch, and remembering that, by reason of the spring-loaded check valve 26, the pressure in the chamber 7 is, for example, 130 pounds per square inch, when the use of fluid under pressure from the storage reservoir 1 has reduced the pressure therein and in the chamber 6 in the drain valve 24 to a value of 140 pounds per square inch, a pressure differential of 10 pounds per square inch is established on the opposite sides of the diaphragm 4 and likewise on the opposite sides of the Belleville spring 8a. In other words, the pressure acting on the upper side of the diaphragm 4 and Belleville spring 8a now exceeds the pressure acting on the lower side of this diaphragm and spring by 10 pounds per square inch, whereas prior to use of fluid under pressure from the storage reservoir 1, the pressure acting on the upper side of this diaphragm and spring exceeded the pressure acting on the respective lower sides by 20 pounds per square inch.

Accordingly, when the pressure differential on the respective opposite sides of the Belleville spring 8a is thus reduced to 10 pounds per square inch, this pressure differential is insufficient to maintain this spring turned inside out. Consequently, it will now turn outside in, or in other words, return or snap back to the position shown in FIG. 3.

As the Belleville spring 8a returns to the position shown in FIG. 3, it is effective to deflect simultaneously the diaphragm 4 upward to the position shown thus moving this diaphragm out of sealing contact with the flat surface 12 and lifting the boss 10 out of the bore 11.

When the Belleville spring 8a and diaphragm 4 return to the position shown in FIG. 3, the trapped fluid under pressure present in the volume reservoir 27 and in the chamber 7 above the contaminants in this chamber and acting on the lower side of the Belleville spring 8a is rendered effective to force substantially all of the contaminants present in this chamber 7 to flow to atmosphere via the bore 11 before this fluid under pressure begins to flow to atmosphere via this bore.

When the trapped fluid under pressure present in the chamber 7 and in the volume reservoir 27 begins to flow to atmosphere via the bore 11, this pressure is reduced at a much more rapid rate than the pressure in the chamber 6 above the diaphragm 4 and Belleville spring 8a is reduced as the result of the use of fluid under pressure from the storage reservoir 1 the volume of which is many times that of the combined volume of the reservoir 27 and the chamber 7. Furthermore, the choke 25 restricts the rate at which fluid under pressure can flow from the storage reservoir 1 and chamber 6 to the volume reservoir 27 and chamber 7 via the spring-loaded check valve 26 which ensures that the pressure in the chamber 6 and storage reservoir 1 quickly exceeds that in the volume reservoir 27 and chamber 7 by a chosen amount which may be, for example, 20 pounds per square inch, as hereinbefore stated.

Accordingly, the pressure in the chamber 7 and the volume reservoir 27 is rapidly reduced by flow to atmosphere via the bore 11 to a value that is, for example, less than that in the chamber 6 by 20 pounds per square inch.

When the pressure in the chamber 6 and the storage reservoir 1 exceeds that in the chamber 7 and the volume reservoir 27 by a value of, for example, 20 pounds per square inch, or in other words, the pressure in the chamber 6 and the storage reservoir 1 has reduced to, for example, substantially 140 pounds per square inch, and the pressure in the chamber 7 and the volume reservoir 27 has reduced to, for example, 120 pounds per square inch, a sufficient differential of pressure is established on the opposite sides of the Belleville spring 8a, and likewise on the opposite sides of the diaphragm 4, to respectively cause the Belleville spring 8a to snap down and turn inside out and the diaphragm 4 to deflect downward until the boss 10 is disposed in the bore 11 and that portion of this diaphragm surrounding the boss 10 forms a seal with the flat surface or valve seat 12 on the bottom cover member 5a thus cutting off flow of fluid under pressure from the chamber 7 to atmosphere via the bore 11. Likewise, flow of fluid under pressure from the volume reservoir 27, storage reservoir 1 and chamber 6 to atmosphere via the bore 11 is terminated.

When further use of fluid under pressure from the storage reservoir 1 reduces the pressure therein to the value at which the governor operates to reload the compressor, it will operate to supply fluid under pressure to this reservoir 1 until the pressure therein is increased to the value required to cause unloading of this compressor. Subsequent use of fluid under pressure from the storage reservoir 1 will reduce the pressure therein and cause the drain valve 24 to again operate in the manner hereinbefore described in detail to release contaminants from the chamber 7 in this drain valve to atmosphere.

From the foregoing, it is apparent that each time the pressure in the storage reservoir 1 is reduced as the result of usage of fluid under pressure therefrom subsequent to the unloading of the compressor that supplies fluid under pressure to this reservoir, the drain valve 24 operates to expel contaminants to atmosphere as does the drain valve 2 constituting the first embodiment of the invention.

Having described the invention, what we claim as new and desire to secure by Letters Patent, is:

1. A drain valve for expelling contaminants from a fluid pressure storage reservoir, said drain valve comprising:

a. a pair of casing sections each having a cavity therein, one of said casing section being provided with an annular valve seat in the bottom of its respective cavity, and the other of said casing sections being provided adjacent the top of its respective cavity with an annular shoulder, b. a diaphragm having its outer periphery clamped between said pair of casing sections and cooperating therewith to form on the respective opposite sides thereof a supply chamber and an exhaust chamber, each of which has a passageway opening thereinto for communication with the storage reservoir, said diaphragm cooperating with said valve seat to control communication between said exhaust chamber and atmosphere, and wherein the improvement comprises:

c. an annular Belleville spring having a normal outside-in position and movable to a turned-inside-out position, said spring being disposed on one side of said diaphragm with its outer periphery interposed between said one side of said diaphragm and said annular shoulder for normally biasing said diaphragm to a preselected one of two positions relative to said seat and operable, in response to the pressure in one of said chambers exceeding that in the other, from is outside-in position to its turned-inside-out position to effect a corresponding change in the position of said diaphragm with respect to said valve seat.

* * * * *